US011218407B2

(12) United States Patent
Ramsland

(10) Patent No.: US 11,218,407 B2
(45) Date of Patent: Jan. 4, 2022

(54) POPULATING CAPACITY-LIMITED FORWARDING TABLES IN ROUTERS TO MAINTAIN LOOP-FREE ROUTING

(71) Applicant: Ciena Corporation, Hanover, MD (US)

(72) Inventor: Thor Odd Andres Ramsland, Woodbine, MD (US)

(73) Assignee: Ciena Corporation, Hanover, MD (US)

( * ) Notice: Subject to any disclaimer, the term of this patent is extended or adjusted under 35 U.S.C. 154(b) by 22 days.

(21) Appl. No.: 16/860,384

(22) Filed: Apr. 28, 2020

(65) Prior Publication Data

US 2021/0336877 A1 Oct. 28, 2021

(51) Int. Cl.
*H04L 12/717* (2013.01)
*H04L 12/705* (2013.01)
(Continued)

(52) U.S. Cl.
CPC ............ *H04L 45/42* (2013.01); *H04L 45/021* (2013.01); *H04L 45/04* (2013.01); *H04L 45/18* (2013.01); *H04L 45/748* (2013.01)

(58) Field of Classification Search
CPC ......... H04L 45/18; H04L 45/02; H04L 12/56; H04L 12/28; H04L 12/26; H04L 12/733; H04L 12/833; H04L 12/851; H04L 12/857; H04L 12/725; H04L 45/302; H04L 45/507; H04L 47/24; H04L 45/50; H04L 47/17; H04L 12/723; H04L 12/701; H04L 12/715; H04L 12/741; H04L 12/803; H04L 45/502; H04L 47/125; H04L 47/31; H04J 1/16
(Continued)

(56) References Cited

U.S. PATENT DOCUMENTS 7,023,808 B2 * 4/2006 Ball .................. H04L 45/56
370/238
7,042,884 B2 * 5/2006 Huang ................ H04L 45/04
370/395.54
(Continued)

OTHER PUBLICATIONS

Rekhter et al., Network Working Group, Category: Standards Track, A Border Gateway Protocol 4 (BGP-4), The Internet Society, Jan. 2006, pp. 1-105.
(Continued)

*Primary Examiner* — Man U Phan
(74) *Attorney, Agent, or Firm* — Clements Bernard Baratta; Lawrence A. Baratta, Jr.; Christopher L. Bernard

(57) ABSTRACT

A router includes a plurality of ports interconnected to one or more Customer Edge (CE) nodes and one or more Provider Edge (PE) nodes; and memory storing a forwarding table of routes, wherein the routes in the forwarding table are installed automatically based on static or Interior Gateway Protocol (IGP)-learned default routes, connected routes, Border Gateway Protocol (BGP) routes learned from peers, and routes in an Internet routing table, and wherein a number of the routes installed in the forwarding table is less than a number of routes in the Internet routing table. The number of routes in the Internet routing table exceeds a capacity of the memory, and the routes installed in the forwarding table ensure a loop-free topology. The routes installed in the forwarding table can include all of the BGP routes learned from peers plus longer prefix matches from the routes in the Internet routing table.

17 Claims, 6 Drawing Sheets

(51) Int. Cl.
*H04L 12/745* (2013.01)
*H04L 12/715* (2013.01)
*H04L 12/755* (2013.01)

(58) Field of Classification Search
USPC .......................................................... 370/351
See application file for complete search history.

(56) References Cited

U.S. PATENT DOCUMENTS

| | | | | |
|---|---|---|---|---|
| 7,453,883 | B1 * | 11/2008 | Lynch | H04L 45/00 |
| | | | | 370/389 |
| 7,852,852 | B2 * | 12/2010 | Lynch | H04L 45/54 |
| | | | | 370/395.32 |
| 8,379,649 | B2 * | 2/2013 | Yamate | H04L 45/54 |
| | | | | 370/395.31 |
| 8,547,851 | B1 | 10/2013 | Jacobson et al. | |
| 8,572,281 | B1 | 10/2013 | Jesuraj | |
| 8,750,099 | B2 * | 6/2014 | Patel | H04L 45/22 |
| | | | | 370/225 |
| 8,817,798 | B2 | 8/2014 | Skalecki et al. | |
| 9,166,929 | B1 | 10/2015 | Kamath et al. | |
| 9,356,857 | B1 * | 5/2016 | Narayanan | H04L 45/302 |
| 9,379,971 | B2 * | 6/2016 | Sem-Jacobsen | H04L 45/02 |
| 9,491,058 | B2 | 11/2016 | Filsfils et al. | |
| 9,847,935 | B2 * | 12/2017 | Gobriel | H04L 45/021 |
| 9,894,002 | B1 * | 2/2018 | Narayanan | H04L 47/17 |
| 10,394,784 | B2 * | 8/2019 | Marohn | G06F 16/00 |
| 10,623,311 | B2 * | 4/2020 | Gobriel | H04L 45/021 |
| 2012/0099858 | A1 | 4/2012 | Moore et al. | |
| 2016/0241474 | A1 * | 8/2016 | Wang | H04L 45/7453 |
| 2018/0359323 | A1 | 12/2018 | Madden | |

OTHER PUBLICATIONS

Sangli et al., Network Working Group, Category: Standards Track, BGP Extended Communities Attribute, The Internet Society, Feb. 2006, pp. 1-12.

* cited by examiner

1. Process scans iBGP routes, compares to eBGP routes and tags any more-specific prefixes of eBGP routes coming from iBGP.
2. Process automatically leaks all eBGP and tagged iBGP routes through table-map

POPULATING CAPACITY-LIMITED FORWARDING TABLES IN ROUTERS TO MAINTAIN LOOP-FREE ROUTING

FIELD OF THE DISCLOSURE

The present disclosure generally relates to networking. More particularly, the present disclosure relates to systems and methods for populating capacity-limited forwarding tables in routers to maintain loop-free routing.

BACKGROUND OF THE DISCLOSURE

The introduction of merchant silicon network processing devices has lowered the cost of entry for networking platforms, i.e., routers. However, these routers often have forwarding tables of such limited capacity that they cannot support the full internet routing table. As is known in the art, a forwarding table (also referred to as a Forwarding Information Base (FIB) and these terms are used interchangeably herein) is utilized to specify next-hop forwarding. For example, for illustrating this limitation, a full complement of Internet routes may include 800 k or more routes, whereas network processing devices may be limited to support a subset, such as 200 k or so routes. One solution to address this limitation, to support the full internet routing table, includes the addition of Ternary Content-Addressable Memory (TCAM) to sufficiently expand the FIB capacity to carry full Internet routes. In the absence of sufficient table memory, software mechanisms may be employed to control and limit the installation of routes into a router's FIB to prevent exceeding its route capacity. One such mechanism is the application of a Border Gateway Protocol (BGP) route filter between the BGP process and the global Routing Information Base (RIB) (also referred to as a routing table and these terms are used interchangeably herein), which allows BGP to carry a full Internet route table while limiting the number of BGP-learned routes installed in the FIB. This can be a useful approach at a service provider's Customer Edge (CE) nodes in cases where the router must share the full Internet routing table with a BGP-peered customer, learn the customer's routes via BGP, but does not need the full Internet table for traffic-forwarding purposes, instead of relying on Interior Gateway Protocol (IGP), static, and connected routes for traffic forwarding toward the provider's core network.

Disadvantageously, deploying additional TCAM to increase the forwarding table scale adds considerable cost to the solution and may consume resources on the system that could be used for other purposes. This defeats the advantages of using merchant silicon network processing devices. Also, filtering BGP routes between the BGP process and the FIB while relying on IGP, static, or connected routes for traffic forwarding can result in routing loops. To avoid these loops, providers must identify the sources of these loops, and ensure the correct subset of BGP routes are leaked into the FIBs of forwarding-table-size restricted systems. This can a manual process, is subject to human error, is difficult to implement in a "permanent" fashion, and may be inefficient to introduce broadly. Customer changes to their BGP route advertisements, for example, could potentially introduce new loops at any time.

BRIEF SUMMARY OF THE DISCLOSURE

The present disclosure relates to systems and methods for populating capacity-limited forwarding tables in routers to maintain loop-free routing. The present disclosure provides a technique for automatically populating the FIB in a constrained environment. Specifically, the present disclosure includes the automatic identification and augmentation of one set of BGP routes to be installed in the FIB with the longer-prefix matches from another set of BGP routes to be filtered from the FIB, for route loop avoidance. This approach is especially useful in an Internet Protocol (IP) pre-aggregation role, i.e., in a pre-aggregation router that is dual-homed to PE routers northbound toward the core of the network, and hosts customers that peer with the provider via BGP and desire to receive the full internet-routing table from the provider. The approach described herein addresses the aforementioned problems without the need for an external TCAM, thereby maintaining the cost advantages of merchant silicon network processing devices.

In an embodiment, a router includes a plurality of ports interconnected to one or more Customer Edge (CE) nodes and one or more Provider Edge (PE) nodes; and memory storing a forwarding table of routes, wherein the router is configured to automatically install routes in the forwarding table based on static configuration or Interior Gateway Protocol (IGP)-learned default routes, connected routes, Border Gateway Protocol (BGP) routes learned from peers, and routes in an Internet routing table, and wherein a number of the routes installed in the forwarding table is less than a number of routes in the Internet routing table. The number of routes in the Internet routing table can exceed a capacity of the memory, and wherein the routes selectively installed in the forwarding table ensure a loop-free topology. The routes installed in the forwarding table can include all of the BGP routes learned from peers plus longer prefix matches from the routes in the Internet routing table.

The default routes, the BGP routes learned from peers, and the routes in the Internet routing table can be segmented into lists that are filtered via table-map for the automatic installation. The BGP routes learned from peers can be external BGP (eBGP) routes and the routes in the Internet routing table can be internal BGP (iBGP) routes, wherein the router can be configured to scan the iBGP routes and compare to the eBGP routes to determine any more specific prefixes of the eBGP routes in the iBGP routes, and install all the eBGP routes and any determined iBGP routes in the forwarding table. The routes installed in the forwarding table can be based on Community attribute or an Extended Community attribute in the BGP routes learned from peers and the routes in the Internet routing table. The router can be a pre-aggregation router aggregating a plurality of lower speed connections from the one or more CE routers to higher speed connections to the one or more PE nodes.

In another embodiment, a method and instructions stored on non-transitory computer-readable medium are described for performing steps of obtaining a plurality of routes including static configuration or Interior Gateway Protocol (IGP)-learned default routes, connected routes, Border Gateway Protocol (BGP) routes learned from peers, and routes in an Internet routing table; and automatically installing a subset of the plurality of routes in a forwarding table of a router, wherein a number of the subset of the plurality of routes is less than a number of the routes in the Internet routing table. The number of routes in the Internet routing table can exceed a capacity of the forwarding table, and wherein the routes selectively installed in the forwarding table ensure a loop-free topology. The routes installed in the forwarding table can include all of the BGP routes learned from peers plus longer prefix matches from the routes in the Internet routing table.

The default routes, the BGP routes learned from peers, and the routes in the Internet routing table can be segmented into lists that are filtered via table-map for the automatically installing. The BGP routes learned from peers can be external BGP (eBGP) routes and the routes in the Internet routing table can be internal BGP (iBGP) routes, wherein the automatically installing can include scanning the iBGP routes and compare to the eBGP routes to determine any more specific prefixes of the eBGP routes in the iBGP routes, and installing all the eBGP routes and any determined iBGP routes in the forwarding table. The routes installed in the forwarding table can be based on Community attribute or an Extended Community attribute in the BGP routes learned from peers and the routes in the Internet routing table. The router can be a pre-aggregation router aggregating a plurality of lower speed connections from one or more Customer Edge (CE) nodes to higher speed connections to one or more Provider Edge (PE) nodes.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for populating capacity-limited forwarding tables in routers to maintain loop-free routing. The present disclosure provides a technique for automatically populating the FIB in a constrained environment. Specifically, the present disclosure includes the automatic identification and augmentation of one set of BGP routes to be installed in the FIB with the longer-prefix matches from another set of BGP routes to be filtered from the FIB, for route loop avoidance. This approach is especially useful in an Internet Protocol (IP) pre-aggregation role, i.e., in a pre-aggregation router that is dual-homed to PE routers northbound toward the core of the network, and hosts customers that peer with the provider via BGP and desire to receive the full internet-routing table from the provider. The approach described herein addresses the aforementioned problems without the need for an external TCAM, thereby maintaining the cost advantages of merchant silicon network processing devices.

Acronyms

The following table includes a list of the acronyms used herein:

| | |
|---|---|
| AS | Autonomous System |
| BGP | Border Gateway Protocol |
| CE | Customer Edge |
| eBGP | External BGP |
| FIB | Forwarding Information Base (also referred to as a forwarding table) |
| iBGP | Internal BGP |
| IGP | Interior Gateway Protocol |
| IP | Internet Protocol |
| ISIS | Intermediate System-Intermediate System |
| OSPF | Open Shortest Path First |
| PE | Provider Edge |
| RIB | Routing Information Base (also referred to as a routing table) |
| SAG | Service Aggregation Gateway |
| TCAM | Ternary Content-Addressable Memory |

Customer Peering with Table-Map

Figure 1:
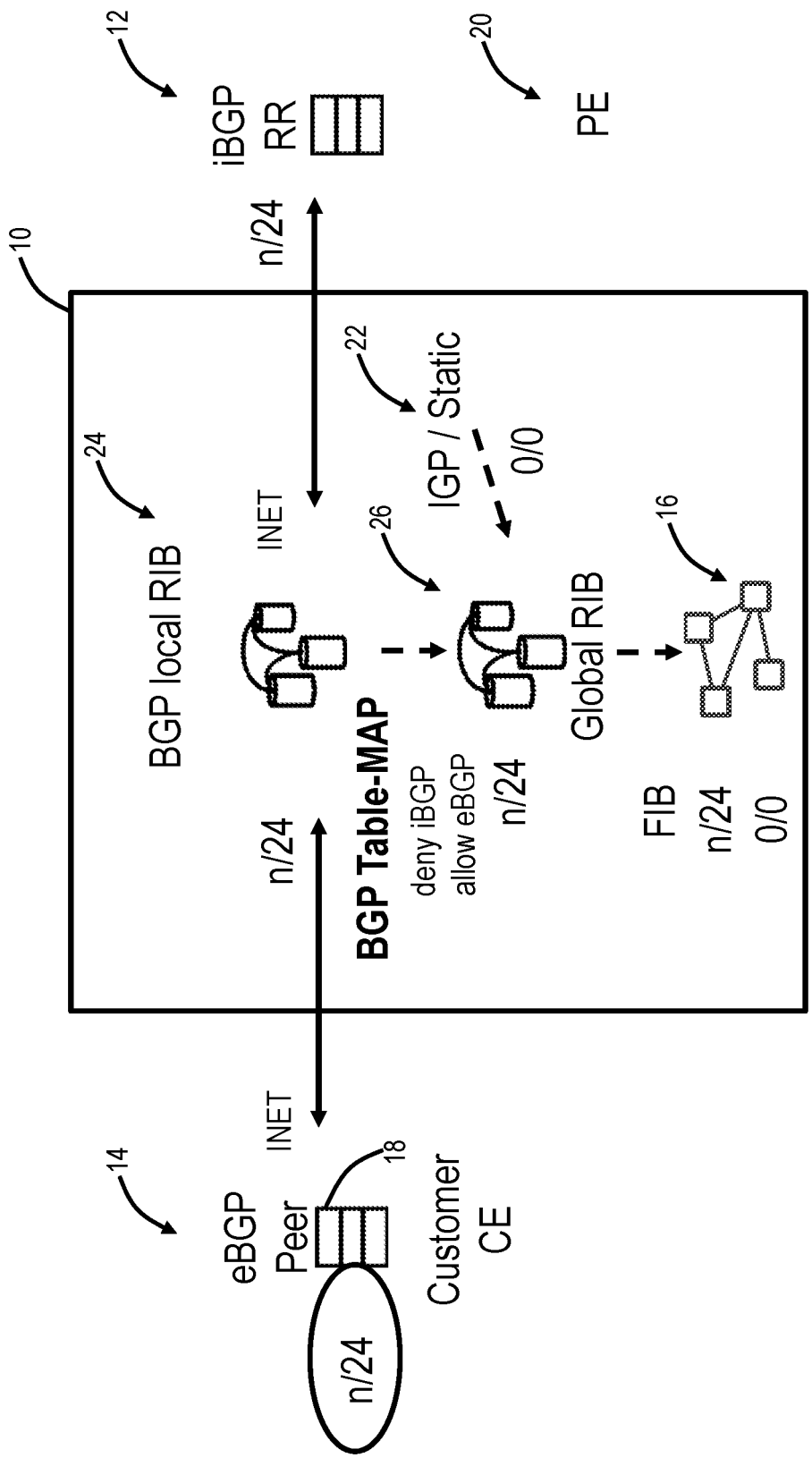
FIG. 1 is a block diagram of a service aggregation router 10 illustrating iBGP peering to BGP Route Reflectors (RR) and eBGP peering to a customer CE router and the use of table-map to selectively install routes in a FIB of the service aggregation router.

FIG. 1 is a block diagram of a service aggregation router 10 illustrating iBGP peering to BGP Route Reflectors (RR) 12 and eBGP peering to a customer CE router 14 and the use of table-map to selectively install routes in a FIB 16 of the service aggregation router 10. The service aggregation router 10 is configured to connect to the eBGP peers 14, which are CE routers 18, such as via 1 Gigabit Ethernet (GbE), 10 GbE, etc. links and can connect to a PE 20 via larger links, e.g., 100 GbE. In some embodiments, the service aggregation router 10 can be referred to as a pre-aggregation router to aggregate multiple links into higher capacity links for connection to the PE 20. The service aggregation router 10 must install eBGP routes from the CE routers 18 in its FIB 16, since the CE routers 18 are connected to the service aggregation router 10. In the various diagrams presented herein, addresses are referenced as n/24 where the first portion, n, is the prefix, and the second portion, 24, is the bitmask. Also, the various descriptions herein use example addressing in the context of IPv4, but those skilled in the art will recognize that the same concepts described herein can apply to addressing in the context of IPv6 as well as other types of addressing. Further, those skilled in the art will recognize an actual network deployment will include various other components, etc. that are omitted herein for illustration purposes.

Again, the FIB 16 is constrained as described herein and not capable of carrying every route it receives, namely the eBGP routes from the CE routers 18, IGP routes 22 received from protocols such as ISIS, OSPF, etc., and iBGP routes received from the iBGP RR 12. However, the service aggregation router 10 is required to provide all of these routes from the iBGP RR 12 to the CE routers 18. As such, all of the iBGP routes received from the iBGP RR 12 are maintained in a local RIB 24 but are not included in the FIB 16. The iBGP routes received from the iBGP RR 12 can include the Internet routing table, and this can be from the RR 12 or specific iBGP peers. The local RIB 24 is a table created by BGP, it can be referred to as a BGP table or BGP RIB. BGP and IGP can feed their tables to a global RIB 26, or global route table. The BGP table-map can function between the BGP local RIB 24 and the global RIB 26. Thus, using table-map to keep the full Internet routing table from getting into the global RIB 26 also keeps it out of the FIB 16 as well. Of note, the filtering mechanisms described herein could also be used between the global RIB 26 and the FIB 16. That is, the present disclosure could be implemented between the BGP local RIB 24 and the global RIB 26, between the global RIB 26 and the FIB 16, between the BGP local RIB 24 and the FIB 16 (including with or without the global RIB 26 in between), and the like. That is, the present disclosure contemplates implementation between any two tables where filtering occurs.

Table-map is a software feature that enables the selective incorporation of the iBGP routes received from the iBGP RR 12 and the eBGP routes from the CE router 18 into the FIB 16. That is, the BGP table-map can be used to filter the routes BGP pushes to the FIB 16. Such filtering can be based on the peer, the Autonomous System (AS) path, an extended-community field, etc. Of note, table-map is one technique for filtering routes into the RIB/FIB, and those skilled in the art will appreciate other techniques are also contemplated. In an embodiment, to support the limited memory in the FIB 16, the BGP table-map can allow eBGP routes learned from the CE routers 18 while denying iBGP routes learned from the iBGP RR 12. Thus, there are two route lists—

Candidate Deny List—iBGP routes learned from the iBGP RR 12 or BGP peers, namely routes learned from a route reflector or a BGP peer, and Candidate Allow List—eBGP routes learned from the connected CE routers 18, namely routes learned from connected CE routers.

And the conventional approach to address the route limitations of the FIB 16 is only to forward the Candidate Allow List. For example, the BGP table-map is configured to deny iBGP routes, i.e., the Candidate Deny List, and to allow eBGP routes, i.e., the Candidate Allow List. Where there is a need for the service aggregation router 10 to forward to a route that is not installed in the FIB 16, the service aggregation router 10 can send the packet upstream to the PE 20 by default.

Routing Loops Caused by Table-Map Usage

Figure 2:
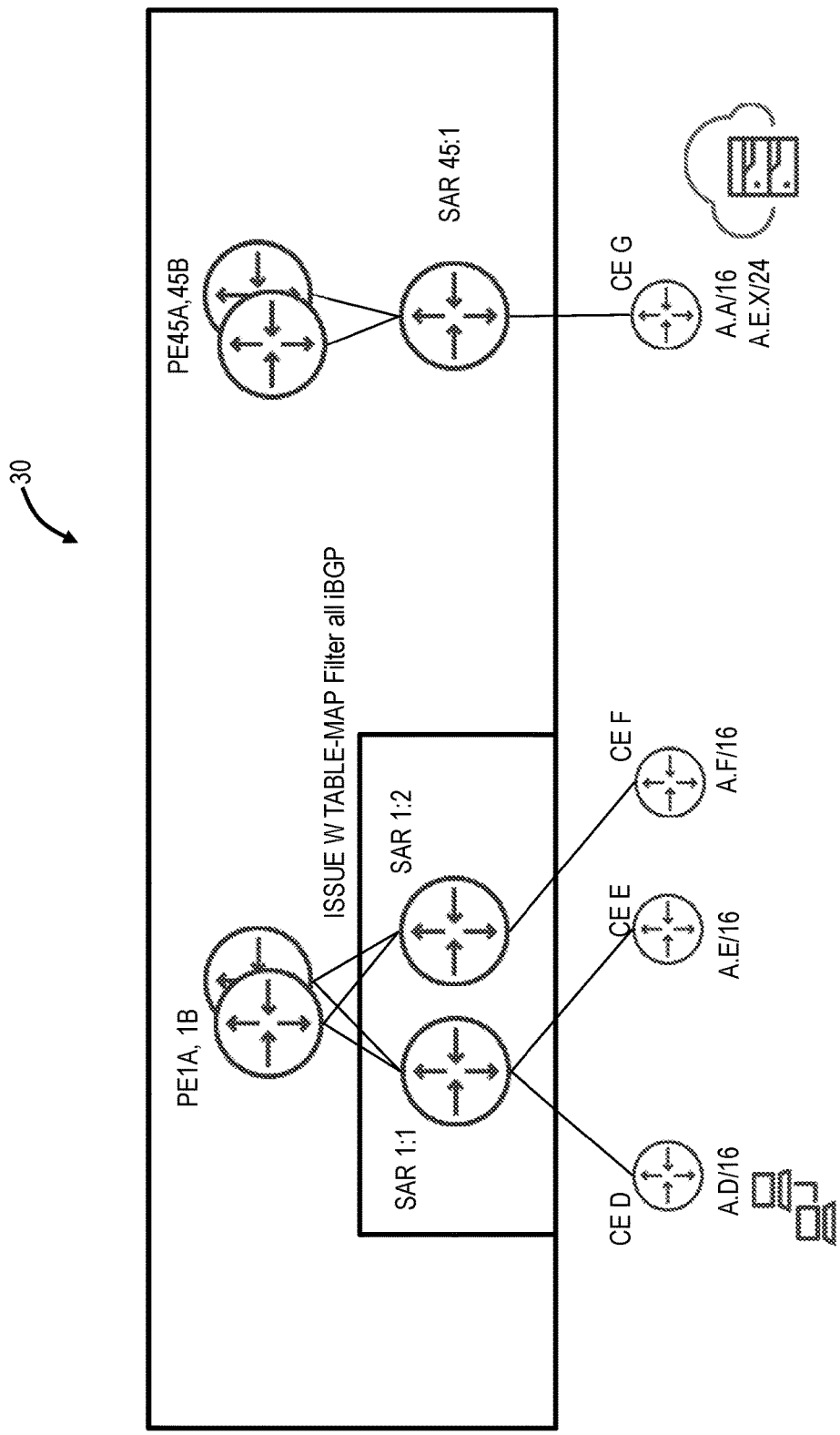
FIG. 2 is a network diagram of a network illustrating an example routing loop caused by the table-map usage described in FIG. 1.

FIG. 2 is a network diagram of a network 30 illustrating an example routing loop caused by the table-map usage described in FIG. 1. In this example, there are four CE routers 18, labeled CE D, CE E, CE F, CE G, three service aggregation routers 10, labeled SAR 1:1, SAR 1:2, 45:1, and four PE 20, labeled PE 1A, PE 1B, PE 45A, PE 45B. Again, addresses are references as n/x where n is the prefix, and x is the bitmask. The CE D is connected to devices having addresses A.D/16, the CE E is connected to devices having addresses A.E/16, the CE F is connected to devices having addresses A.F/16, and the CE G is connected to devices having addresses A.A/16 as well as A.E.X/24, which is a longer prefix than the addresses A.E/16 associated with the CE E. For connectivity, the CE D, CE E are connected to the SAR 1:1, the CE F is connected to the SAR 1:2, and the CE G is connected to the SAR 45:1. Those skilled in the art will recognize the network 30 is presented for illustration, and there can be other nodes, connectivity, etc. which is omitted for simplicity. Further, the service aggregation routers 10 include a plurality of ports, interconnected to one or more CE routers 18 and one or more PE nodes. In this example, the SAR 1:1 is connected to the CE D, CE E, and to the PE 1A, PE 1B.

In this example, assume the SAR 1:1 has constraints in its FIB 16 as described herein, and it uses the table-map to only allow the Candidate Allow List routes. The PE1A, 1B will have a global RIB/FIB with the following routes:

| Address | Node | Protocol |
| --- | --- | --- |
| A.A/16 | SAR 45:1 | BGP |
| A.E.X/24 | SAR 45:1 | BGP |
| A.D/16 | SAR 1:1 | BGP |

-continued

| Address | Node | Protocol |
| --- | --- | --- |
| A.E/16 | SAR 1:1 | BGP |
| A.F/16 | SAR 1:2 | BGP |
| INET/0 | | BGP |

The SAR 1:1 will have the following BGP table:

| Address | Node | Protocol |
| --- | --- | --- |
| A.A/16 | SAR 45:1 | iBGP |
| A.E.X/24 | SAR 45:1 | iBGP |
| A.D/16 | CE D | eBGP |
| A.E/16 | CE E | eBGP |
| A.F/16 | SAR 1:2 | iBGP |
| INET/0 | | iBGP |

Now, the table-map at the SAR 1:1 will filter all iBGP routes, and the global RIB/FIB at the SAR 1:1 will install the following routes. This means that the SAR 1:1 will only have the routes for the CE D, CE E, and any other route will default (0/0) to the PE1A or PE1B.

| Address | Node | Protocol |
| --- | --- | --- |
| A.D/16 | CE D | BGP |
| A.E/16 | CE E | BGP |
| 0/0 | PE1A, PE1B | ISIS |

The CE D will have the following global RIB/FIB:

| Address | Node | Protocol |
| --- | --- | --- |
| A.A/16 | SAR 1:1 | BGP |
| A.E.X/24 | SAR 1:1 | BGP |
| A.E/16 | SAR 1:1 | BGP |
| A.F/16 | SAR 1:1 | BGP |
| INET/0 | SAR 1:1 | BGP |

The CE E will have the following global RIB/FIB:

| Address | Node | Protocol |
| --- | --- | --- |
| A.A/16 | SAR 1:1 | BGP |
| A.E.X/24 | SAR 1:1 | BGP |
| A.D/16 | SAR 1:1 | BGP |
| A.F/16 | SAR 1:1 | BGP |
| INET/0 | SAR 1:1 | BGP |

Now, with the above RIB/FIB programmed, the following describes an example routing loop caused by the fact the SAR 1:1 only installs the eBGP learned routes. The CE D sends traffic to a node A.E.X.22 via the SAR 1:1 per a BGP-learned route. The SAR 1:1 resolves to the most specific route in its global RIB/FIB, A.E/16, and misroutes to the CE E. The CE E resolved to the SAR 1:1 via BGP, routes back to the SAR 1:1, resulting in a routing loop.

BGP Community and Extended Community Attribute

Figure 3:
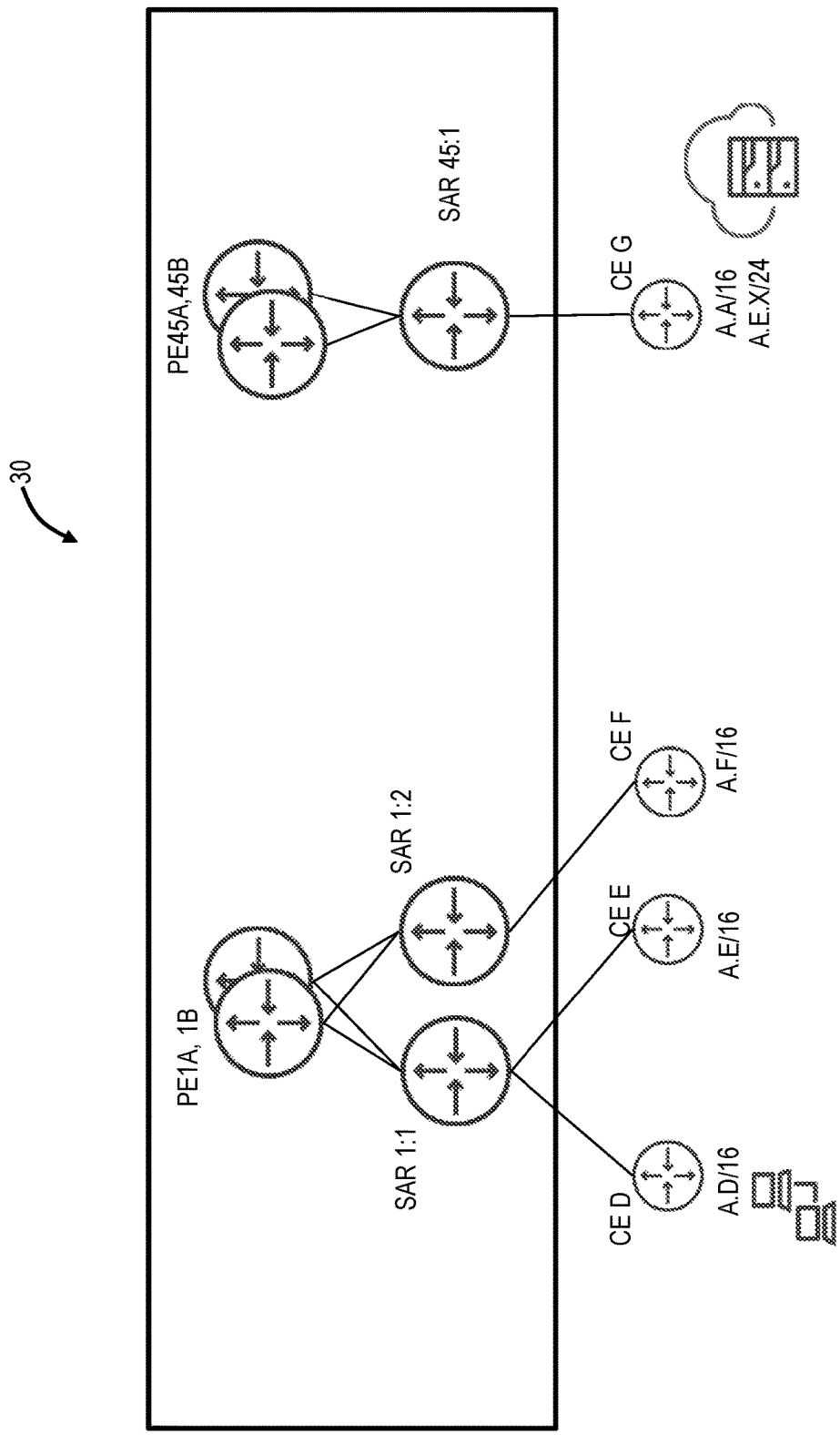
FIG. 3 is a network diagram of the network illustrating the use of the Extended Community attribute in BGP for installing specific routes.

FIG. 3 is a network diagram of the network 30, illustrating the use of the Communities or Extended Community attribute in BGP for installing specific routes. The BGP Community and Extended Community attribute provide a mechanism for labeling information carried in BGP. Specifically, the BGP Community or Extended Community attribute can be set, via configuration, to label different routes. For example, details of the Extended Community attribute are described in RFC 4360 "BGP Extended Communities Attribute," January 2006, the contents of which are incorporated by reference. BGP communities are an optional transitive BGP attribute that can traverse from autonomous system to autonomous system. A BGP community is a 32-bit number that can be included with a route. The Extended Community attribute are a 64-bit number offering more diversity than the BGP community.

In an embodiment, one solution to the routing loop described above is to mark customer-learned routes with specific BGP Community or Extended Community attributes as well as requiring the SAR 1:1 to install all the routes with the specific Extended Community attributes into its global RIB/FIB.

Note, in the example of FIG. 2, the table-map filters the routes to deny iBGP learned routes. That is, the table-map in FIG. 2 utilizes the protocol to determine whether to install the routes in the SAR 1:1, i.e., filter iBGP, allow eBGP, etc. With the Community or Extended Community attribute, the determination of whether to install the route in the RIB/FIB of the SAR 1:1 is based on the Community or Extended Community attribute, not on the protocol used to learn the route.

Again, the service aggregation routers 10 include a plurality of ports, interconnected to one or more CE routers 18 and one or more PE nodes. In this example, the SAR 1:1 is connected to the CE D, CE E, and to the PE 1A, PE 1B. Thus, the SAR 1:1 has the following BGP table:

| Address | Node | Community attribute |
| --- | --- | --- |
| A.A/16 | SAR 45:1 | ext-comm 333 |
| A.E.X/24 | SAR 45:1 | ext-comm 333 |
| A.D/16 | CE D | ext-comm 333 |
| A.E/16 | CE E | ext-comm 333 |
| A.F/16 | SAR 1:2 | ext-comm 333 |
| INET/0 | | ext-comm 333 |

In this configuration, the table-map at the SAR 1:1 is configured to permit routes with the Community attribute of ext-comm 333, for example, and to filter out any other routes. The value "ext-comm 333" is presented for illustration purposes, and those skilled in the art will understand this could be any configured value. Thus, the SAR 1:1 will have the following routes in its global RIB/FIB:

| Address | Node | Protocol |
| --- | --- | --- |
| A.A/16 | SAR 45:1 | BGP |
| A.D/16 | CE D | BGP |
| A.E/16 | CE E | BGP |
| A.E.X/24 | SAR 45:1 | BGP |
| A.F/16 | SAR 1:2 | BGP |
| 0/0 | PE1A, PE1B | ISIS |

Now, in this configuration, the SAR 1:1 will not see a routing loop, having the address A.E.X/24 installed thereon. Note, this approach does solve the routing loop problem but does require management of the routes via the Community or Extended Community attribute. Further, the number of customer-learned routes may push the table size in the SAR 1:1, i.e., this may not solve the constraints.

Automatic Loop Avoidance

Figure 4:
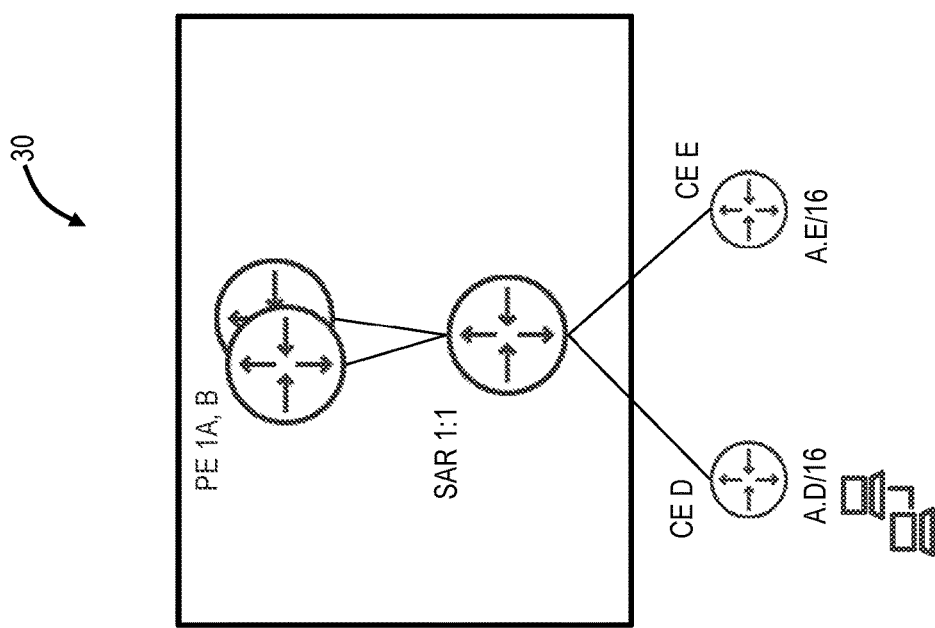
FIG. 4 is a network diagram of a portion of the network for illustrating an automatic loop avoidance process.
Figure 5:
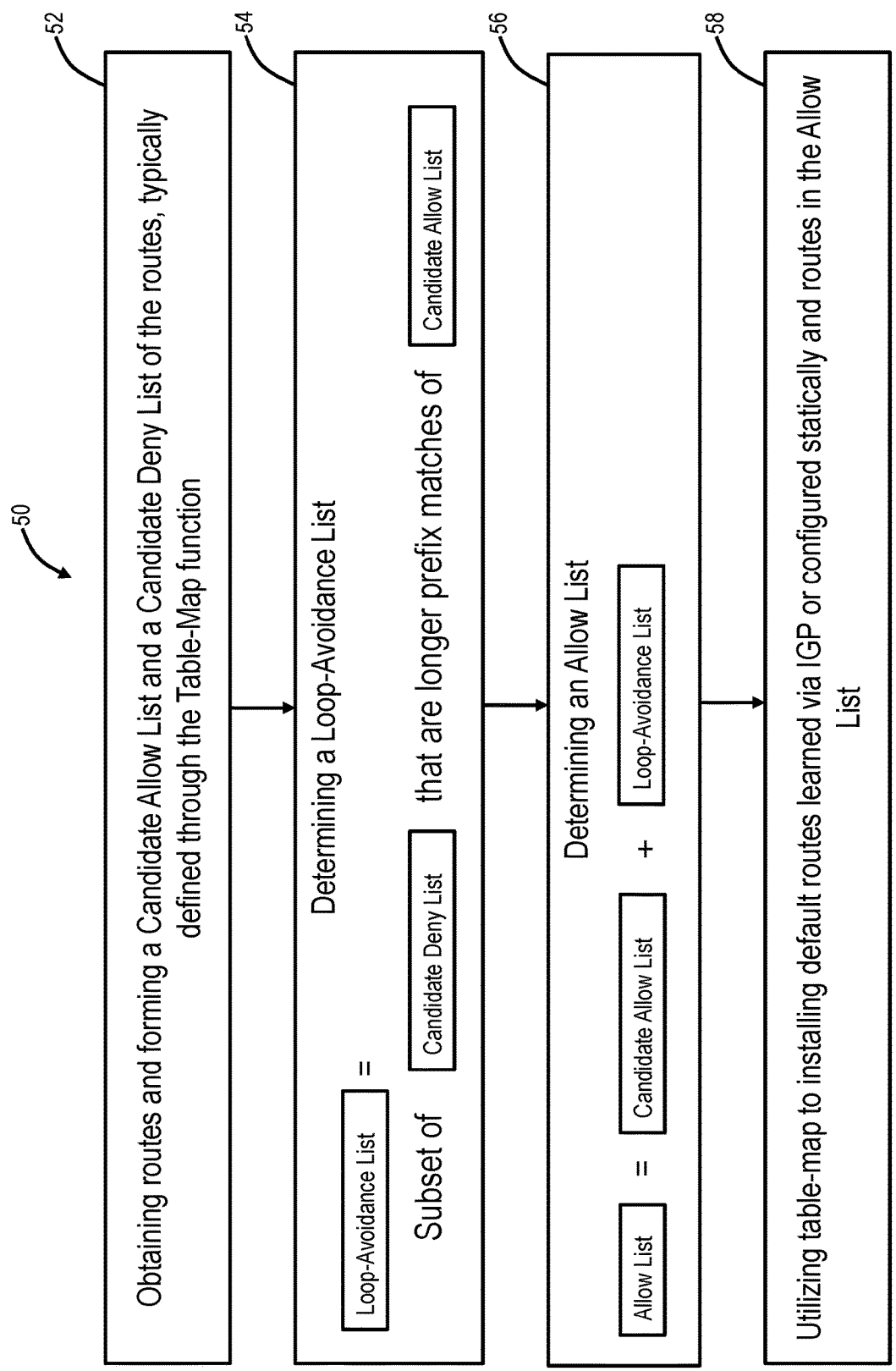
FIG. 5 is a block diagram of the automatic loop avoidance process of how route lists are determined and installed.

FIG. 4 is a network diagram of a portion of the network 30 for illustrating an automatic loop avoidance process. FIG. 5 is a block diagram of the automatic loop avoidance process 50 of how route lists are determined and installed. The process 50 can be implemented in routing software of the router 10, as well as in hardware, firmware, external from the router 10, etc. The process 50 avoids routing loops by comparing two sets of routes, for example, A and B, where A is a candidate set of BGP routes to be installed in the FIB 16, and B is a candidate set of BGP routes to be filtered from the FIB 16. The automatic loop avoidance is based on augmenting the set A with a subset of B that are longer-prefix matches of routes in set A. Used with statically created or IGP-learned default routes, the mechanism efficiently populates a limited-capacity FIB 16 to maintain the loop-free topology in the router 10. Again, an advantage of this approach does not require an additional TCAM, avoiding additional costs associated with it, and preserving any resources it would require for other purposes. Also, this approach removes the manual identification of loop-causing prefixes, i.e., the comparison is done automatically between the two lists—A and B. Further, future changes to customer advertised BGP routes would not create new loops.

The process 50 includes obtaining routes and forming a Candidate Allow List and a Candidate Deny List of the routes, typically defined through the table-map function (step 52). Again, the routes can be obtained via
 a) a static or IGP-learned default route in the FIB,
 b) BGP routes learned from directly BGP-peered customers installed into the FIB, and
 c) The Internet routing table learned from specific iBGP peers or a route-reflector server.

Of course, other techniques for obtaining routes are also contemplated. That is, the present disclosure contemplates route filtering with any sets of routes, learned or configured in any manner, to filter routes to store a subset of all the routes in a capacity-limited FIB/RIB. In an embodiment, the Candidate Allow List equals the BGP routes learned from directly BGP-peered customers, and the Candidate Deny List equals the Internet routing table. Of course, other embodiments are also contemplated.

The process 50 includes determining a Loop-Avoidance List (step 54) and determining an Allow List (step 56). The Loop-Avoidance List equals a subset of the Candidate Deny List with routes having longer prefix matches of routes in the Candidate Allow List. The Allow List equals the Candidate Allow List plus the Loop Avoidance List. Back in the example of FIG. 2, a route A.E/16 is part of the Candidate Allow List, whereas a route A.E.X/24 is part of the Candidate Deny List. In the process 50, the route A.E.X/24 is a longer prefix match of the route A.E/16 and is thus included in the subset of the Candidate Deny List, and therefore installed.

Finally, the process 50 includes Finally, the process 50 includes utilizing table-map to installing default routes learned via IGP or configured statically and routes in the Allow List (step 58).

In FIG. 4, again, the service aggregation routers 10 (SAR 1:1) include a plurality of ports, interconnected to one or more CE routers 18 and one or more PE nodes. In this example, the SAR 1:1 is connected to the CE D, CE E, and to the PE 1A, PE 1B. In the example of FIG. 4, the process 50 scans iBGP routes, compares to eBGP routes, and tags any more specific prefixes of eBGP routes coming from iBGP. The process 50 automatically leaks (installs) all eBGP and tagged iBGP routes through table-map.

In this example, the SAR 1:1 has the following BGP table:

| Address | Node | Protocol |
| --- | --- | --- |
| A.A/16 | SAR 45:1 | iBGP |
| A.E.X/24 | SAR 45:1 | iBGP |
| A.F/16 | SAR 1:2 | iBGP |
| INET/0 | | iBGP |
| A.D/16 | CE D | eBGP |
| A.E/16 | CE E | eBGP |

Again, there would be two lists—a Candidate Allow List including the two eBGP routes and a Candidate Deny List including the four iBGP routes. With the process 50, the route A.E.X/24 is identified as more specific than A.E/16, therefore leaked through table-map.

After the process 50, the SAR 1:1 has the following routes in the global RIB/FIB:

| Address | Node | Protocol |
| --- | --- | --- |
| A.D/16 | CE D | BGP |
| A.E/16 | CE E | BGP |
| A.E.X/24 | SAR 45:1 | BGP |
| 0/0 | PE1A, PE1B | ISIS |

Figure 6:
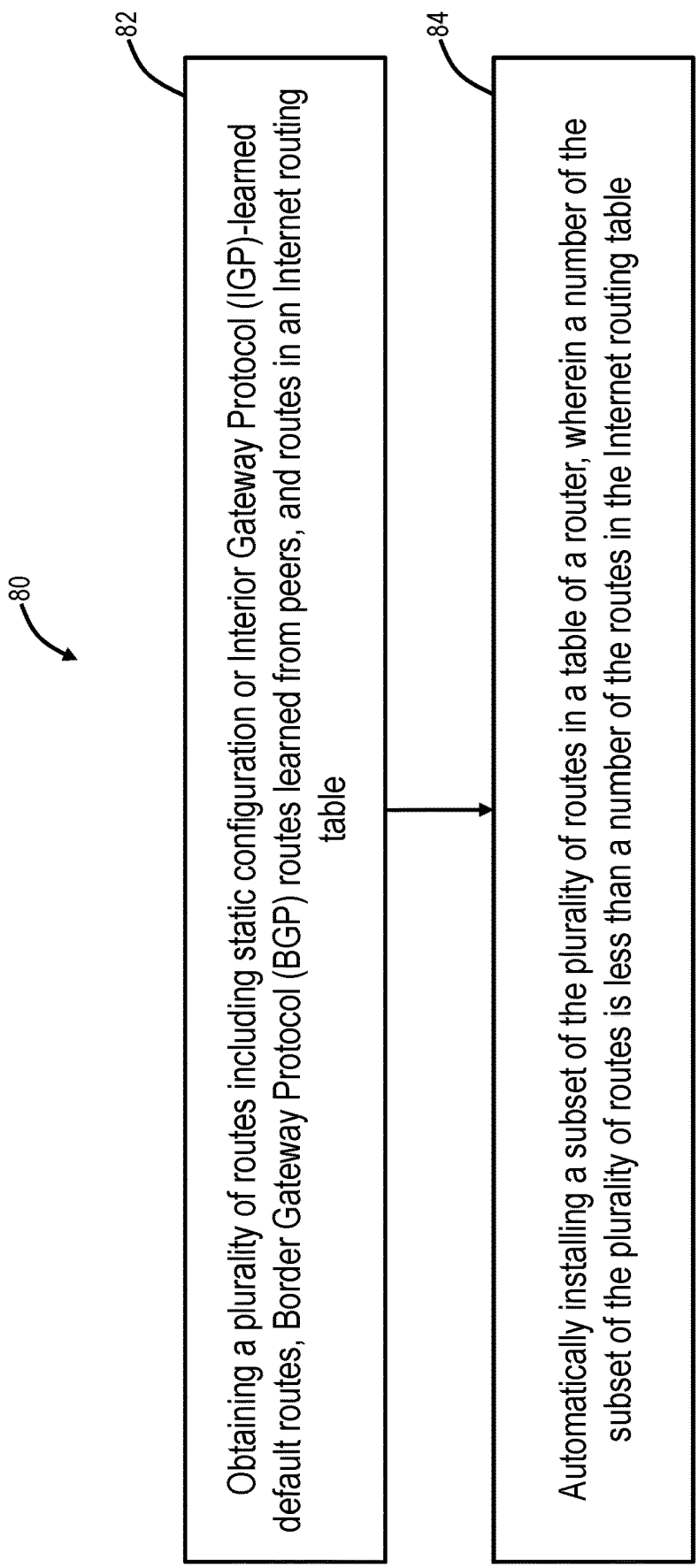
FIG. 6 is a flowchart of a process for populating capacity-limited forwarding tables in routers to maintain loop-free routing.

Process for Populating Capacity-Limited Forwarding Tables in Routers to Maintain Loop-Free Routing FIG. 6 is a flowchart of a process 80 for populating capacity-limited forwarding tables in routers to maintain loop-free routing. The process 80 contemplates implementation via the service aggregation router 10, e.g., the SAR 1:1, as a method including one performed by routing software, and as instructions stored on a non-transitory computer-readable medium for programming one or more processors to perform the associated steps.

The process 80 includes obtaining a plurality of routes including static configuration or Interior Gateway Protocol (IGP)-learned default routes, Border Gateway Protocol (BGP) routes learned from peers, connected routes, and routes in an Internet routing table (step 82); and automatically installing a subset of the plurality of routes in a routing table of a router, wherein a number of the subset of the plurality of routes is less than a number of the routes in the Internet routing table (step 84).

The number of routes in the Internet routing table can exceed a capacity of the memory, and the routes are selectively installed in the forwarding table to ensure a loop-free topology. The routes installed in the forwarding table can include all of the BGP routes learned from eBGP peers plus longer prefix matches from the routes in the Internet routing table. The default routes, the BGP routes learned from peers, and the routes in the Internet routing table can be segmented into lists that are filtered via table-map for the automatically installing.

The BGP routes learned from external peers are external BGP (eBGP) routes and the routes in the Internet routing table are internal BGP (iBGP) routes, wherein the automatically installing can include scanning the iBGP routes and compare to the eBGP routes to determine any more specific prefixes of the eBGP routes in the iBGP routes and installing all the eBGP routes and any determined iBGP routes in the forwarding table. The routes installed in the forwarding table can be based on a Community attribute or an Extended Community attribute in the BGP routes learned from peers and the routes in the Internet routing table. The router can be a pre-aggregation router aggregating a plurality of lower speed connections from the one or more CE routers to higher speed connections to the one or more PE nodes.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, one or more processors, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A router comprising:
 a plurality of ports interconnected to one or more Customer Edge (CE) nodes and one or more Provider Edge (PE) nodes; and
 memory storing a forwarding table of routes, wherein the router includes one or more processors and memory storing instructions that, when executed, cause the one or more processor to
 automatically install routes in the forwarding table based on static configuration or Interior Gateway Protocol (IGP)-learned default routes, connected routes, Border Gateway Protocol (BGP) routes learned from peers, and routes in an Internet routing table, and wherein a number of the routes installed in the forwarding table is less than a number of routes in the Internet routing table, wherein the BGP routes learned from peers are external BGP (eBGP) routes and the routes in the Internet routing table are internal BGP (iBGP) routes, scan the iBGP routes and compare to the eBGP routes to determine any more specific prefixes of the eBGP routes in the iBGP routes, and install all the eBGP routes and any determined iBGP routes in the forwarding table.

2. The router of claim 1, wherein the number of routes in the Internet routing table exceeds a capacity of the memory, and wherein the routes selectively installed in the forwarding table ensure a loop-free topology.

3. The router of claim 1, wherein the routes installed in the forwarding table include all of the BGP routes learned from peers plus longer prefix matches from the routes in the Internet routing table.

4. The router of claim 1, wherein the default routes, the BGP routes learned from peers, and the routes in the Internet routing table are segmented into lists that are filtered via table-map for the automatic installation.

5. The router of claim 1, wherein the routes installed in the forwarding table are based on Community attribute or an Extended Community attribute in the BGP routes learned from peers and the routes in the Internet routing table.

6. The router of claim 1, wherein the router is a pre-aggregation router aggregating a plurality of lower speed connections from the one or more CE routers to higher speed connections to the one or more PE nodes.

7. A non-transitory computer-readable medium having instructions stored thereon that, when executed, cause one or more processors to perform steps of:

obtaining a plurality of routes including static configuration or Interior Gateway Protocol (IGP)-learned default routes, connected routes, Border Gateway Protocol (BGP) routes learned from peers, and routes in an Internet routing table, wherein the BGP routes learned from peers are external BGP (eBGP) routes and the routes in the Internet routing table are internal BGP (iBGP) routes; and automatically installing a subset of the plurality of routes in a forwarding table of a router, wherein a number of the subset of the plurality of routes is less than a number of the routes in the Internet routing table, wherein the automatically installing includes scanning the iBGP routes and compare to the eBGP routes to determine any more specific prefixes of the eBGP routes in the iBGP routes, and installing all the eBGP routes and any determined iBGP routes in the forwarding table.

8. The non-transitory computer-readable medium of claim 7, wherein the number of routes in the Internet routing table exceeds a capacity of the forwarding table, and wherein the routes selectively installed in the forwarding table ensure a loop-free topology.

9. The non-transitory computer-readable medium of claim 7, wherein the routes installed in the forwarding table include all of the BGP routes learned from peers plus longer prefix matches from the routes in the Internet routing table.

10. The non-transitory computer-readable medium of claim 7, wherein the default routes, the BGP routes learned from peers, and the routes in the Internet routing table are segmented into lists that are filtered via table-map for the automatically installing.

11. The non-transitory computer-readable medium of claim 7, wherein the routes installed in the forwarding table are based on Community attribute or an Extended Community attribute in the BGP routes learned from peers and the routes in the Internet routing table.

12. The non-transitory computer-readable medium of claim 7, wherein the router is a pre-aggregation router aggregating a plurality of lower speed connections from one or more Customer Edge (CE) nodes to higher speed connections to one or more Provider Edge (PE) nodes.

13. A method implemented by one or more processors comprising:

obtaining a plurality of routes including static configuration or Interior Gateway Protocol (IGP)-learned default routes, connected routes, Border Gateway Protocol (BGP) routes learned from peers, and routes in an Internet routing table, wherein the BGP routes learned from peers are external BGP (eBGP) routes and the routes in the Internal routing table are interal BGP (iBGP) routes; and automatically installing a subset of the plurality of routes in a forwarding table of a router, wherein a number of the subset of the plurality of routes is less than a number of the routes in the Internet routing table, wherein the automatically installing includes scanning the iBGP routes and compare to the eBGP routes to determine any more specific prefixes of the eBGP routes in the iBGP routes, and installing all the eBGP routes and any determined iBGP routes in the forwarding table.

14. The method of claim 13, wherein the number of routes in the Internet routing table exceeds a capacity of the forwarding table, and wherein the routes selectively installed in the forwarding table ensure a loop-free topology.

15. The method of claim 13, wherein the routes installed in the forwarding table include all of the BGP routes learned from peers plus longer prefix matches from the routes in the Internet routing table.

16. The method of claim 13, wherein the default routes, the BGP routes learned from peers, and the routes in the Internet routing table are segmented into lists that are filtered via table-map for the automatically installing.

17. The method of claim 13, wherein the routes installed in the forwarding table are based on Community attribute or an Extended Community attribute in the BGP routes learned from peers and the routes in the Internet routing table.

* * * * *